(12) United States Patent
Kroo (10) Patent No.: US 9,845,150 B2
(45) Date of Patent: *Dec. 19, 2017

(54) PERSONAL AIRCRAFT

(71) Applicant: Kitty Hawk Corporation, Mountain View, CA (US)

(72) Inventor: Ilan Kroo, Stanford, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 440 days.

This patent is subject to a terminal disclaimer.

(21) Appl. No.: 13/764,697

(22) Filed: Feb. 11, 2013

(65) Prior Publication Data

US 2013/0214086 A1 Aug. 22, 2013

Related U.S. Application Data

(63) Continuation of application No. 13/229,717, filed on Sep. 10, 2011, now Pat. No. 8,393,564, which is a
(Continued)

(51) Int. Cl.
*B64C 27/22* (2006.01)
*B64C 3/56* (2006.01)
*B64C 29/00* (2006.01)

(52) U.S. Cl.
CPC .............. *B64C 27/22* (2013.01); *B64C 3/56* (2013.01); *B64C 29/00* (2013.01); *B64C 29/0025* (2013.01); *Y02T 50/145* (2013.01)

(58) Field of Classification Search
USPC ............. 244/17.11, 17.23, 6, 45 A, 45 R, 55
See application file for complete search history.

(56) References Cited

U.S. PATENT DOCUMENTS 1,425,555 A 8/1922 Thompson
3,856,238 A 12/1974 Malvestuto, Jr.
(Continued)

FOREIGN PATENT DOCUMENTS

CN 1978277 A 6/2007
GB 1 421 013 A 1/1976
(Continued)

OTHER PUBLICATIONS

Canadian Intellectual Property Office, Office Action, Canadian Application No. 2,801,651, Nov. 26, 2013, three pages.
(Continued)

*Primary Examiner* — Troy Chambers
*Assistant Examiner* — Jamie S Stehle
(74) *Attorney, Agent, or Firm* — Van Pelt, Yi & James LLP (57) ABSTRACT

A safe, quiet, easy to control, efficient, and compact aircraft configuration is enabled through the combination of multiple vertical lift rotors, tandem wings, and forward thrust propellers. The vertical lift rotors, in combination with a front and rear wing, permits a balancing of the center of lift with the center of gravity for both vertical and horizontal flight. This wing and multiple rotor system has the ability to tolerate a relatively large variation of the payload weight for hover, transition, or cruise flight while also providing vertical thrust redundancy. The propulsion system uses multiple lift rotors and forward thrust propellers of a small enough size to be shielded from potential blade strike and provide increased perceived and real safety to the passengers. Using multiple independent rotors provides redundancy and the elimination of single point failure modes that can make the vehicle non-operable in flight.

35 Claims, 7 Drawing Sheets

Related U.S. Application Data continuation of application No. PCT/US2011/044591, filed on Jul. 19, 2011.

(60) Provisional application No. 61/365,761, filed on Jul. 19, 2010.

(56) References Cited

U.S. PATENT DOCUMENTS

| | | |
|---|---|---|
| 6,293,491 B1 | 9/2001 | Wobben |
| 6,561,456 B1 | 5/2003 | Devine |
| 6,843,447 B2 | 1/2005 | Morgan |
| 6,969,026 B2 | 11/2005 | Kayama |
| 7,159,817 B2 | 1/2007 | VanderMey et al. |
| 8,393,564 B2 * | 3/2013 | Kroo .................................. 244/6 |
| 8,485,464 B2 | 7/2013 | Kroo |
| 2003/0038213 A1 | 2/2003 | Yoeli |
| 2003/0062443 A1 | 4/2003 | Wagner et al. |
| 2004/0065772 A1 | 4/2004 | Malvestuto |
| 2006/0142904 A1 | 6/2006 | Caillaud et al. |
| 2008/0054121 A1 | 3/2008 | Yoeli |
| 2009/0216392 A1 | 8/2009 | Piasecki et al. |
| 2011/0031355 A1 | 2/2011 | Alvarez Calderon |

FOREIGN PATENT DOCUMENTS

| | | |
|---|---|---|
| JP | 49-019599 | 2/1974 |
| JP | 03-082699 | 8/1991 |
| JP | 05-077789 | 3/1993 |
| JP | 05-262295 | 10/1993 |
| JP | H06-502364 | 3/1994 |
| JP | 2001-071998 | 3/2001 |
| JP | 2004-026034 | 1/2004 |
| JP | 2004-210266 | 7/2004 |
| JP | 2006-290255 | 10/2006 |
| JP | 2009-083798 | 4/2009 |
| JP | 2013-532601 | 8/2013 |
| WO | WO 2006/113877 A2 | 10/2006 |

OTHER PUBLICATIONS

European Patent Office, Supplementary European Search Report and Opinion, European Patent Application No. 11810313.4, Oct. 10, 2013, six pages.
Korean Intellectual Property Office, Office Action, Korean Patent Application No. 10-2013-7004144, Dec. 10, 2013, four pages.
Australian Government, IP Australia, Patent Examination Report No. 1, Australian Patent Application No. 2011282250, Apr. 19, 2013, four pages.
Canadian Intellectual Property Office, Office Action, Canadian Patent Application No. 2,801,651, Apr. 10, 2013, three pages.
Israel Aerospace Industries, Ltd, "Israel Aerospace Industries to Unveil the 'Panther'—A New UAV for Tactical Missions—at 2010 Latrun Conference," Oct. 4, 2010, one page. [Online] [Retrieved Oct. 6, 2010] Retrieved from the Internet <URL:http://www.iai.co.il/32981-41360-en/MediaRoom_News.aspx.>.
Korean Intellectual Property Office, Office Action, Korean Patent Application No. 10-2013-7004144, Apr. 8, 2013, ten pages.
PCT International Search Report and Written Opinion, PCT Application No. PCT/US2011/044591, Mar. 2, 2012, six pages.
PCT International Search Report and Written Opinion, PCT Application No. PCT/US2012/047467, Dec. 3, 2012, ten pages.
Canadian Intellectual Property Office, Office Action, Canadian Patent Application No. 2,801,651, Jul. 2, 2014, 2 Pages.
Japanese Intellectual Property Office, Office Action, Japanese Patent Application No. 2014-521800, Jul. 1, 2014, 9 Pages.
Korean Intellectual Property Office, Office Action, Korean Patent Application No. 10-2014-7003769, May 26, 2014, 19 Pages.
Korean Intellectual Property Office, Notice of Final Rejection, Korean Patent Application No. 10-2013-7004144, Aug. 5, 2013, 4 Pages.
New Zealand Intellectual Property Office, IP No. 607121, Aug. 13, 2013, 2 pages.
Japanese Patent Office, Office Action, Japanese Patent Application No. JP 2013-520824, Jul. 2, 2013, 4 pages.
Taiwan Intellectual Property Office, Office Action, Taiwanese Patent Application No. 101125915, Oct. 6, 2015, six pages. (with English translation of Search Report).

\* cited by examiner

PERSONAL AIRCRAFT

CROSS-REFERENCE TO RELATED APPLICATIONS

This application is a continuation of U.S. patent application Ser. No. 13/229,717, filed Sep. 10, 2011, which is a continuation of PCT application PCT/US2011/044591, filed on Jul. 19, 2011, which claims the benefit of U.S. Provisional Application 61/365,761, filed Jul. 19, 2010. Each application is incorporated by reference in its entirety.

BACKGROUND

Field of the Invention

This disclosure relates generally to a personal aircraft configured to provide safe operations while achieving robust control. In particular, the described invention includes an aircraft with vertical takeoff and landing capability, and which provides vertical and horizontal thrust in a controlled fashion for hover, transition and cruise flight.

Description of Related Art

Taking off and landing vertically, instead of using a runway to develop sufficient velocity on the ground for wings to provide adequate lift, requires an aircraft to provide both vertical and forward thrust. Thrust produced in the vertical direction provides lift to the vehicle; thrust produced horizontally provides forward movement. A vertical takeoff and landing (VTOL) aircraft can produce both vertical and horizontal thrust, and is able to control these forces in a balanced fashion.

The rotary wing aircraft, or helicopter, is one common type of VTOL aircraft. Helicopters have large rotors that provide both vertical and horizontal thrust. In order for the rotors to perform this dual function across a range of airspeeds, the rotors are typically quite complex. Depending on the vehicle flight condition, the rotor blades must be at different orientation angles around the 360 degrees of azimuth rotation to provide the needed thrust. Therefore, rotors have both collective and cyclic variation of the blade orientation angle. Collective varies the angle of each blade equally, independent of the 360-degree rotation azimuth angle. Cyclic varies the blade angle of attack as a function of the 360-degree rotation azimuth angle. Cyclic control allows the rotor to be tilted in various directions and therefore direct the thrust of the rotor forwards, backwards, left or right. This direction provides control forces to move the helicopter in the horizontal plane and respond to disturbances such as wind gusts.

Helicopter rotors are large and unprotected from hitting nearby obstacles. Additionally, they utilize mechanically complex systems to control both the collective and cyclic blade angles. Such rotors are mechanically complex and require maintenance. The rotors generally rotate at a low speed; this results in heavy transmissions between the rotor and motor. The transmissions, or gearboxes, decrease the vehicle payload potential, as well as vehicle safety. Because of the mechanical complexity across the entire vehicle system, many parts are single points of failure. Because of this lack of redundancy, frequent inspections and maintenance are required to keep the vehicle safe.

SUMMARY

The described embodiments provide a personal aircraft with a configuration that is safe, quiet, and efficient, as well as easy to control, highly compact, and which is able to accomplish vertical takeoff and landing with transition to and from forward flight. In one embodiment, the aircraft configuration includes multiple rotors oriented to provide vertical thrust for lift and control during takeoff, transition to and from forward flight, and landing. The rotors are located longitudinally along the port and starboard sides of the fuselage, with two or more rotors located on each side.

The fuselage carries a variable-weight payload. The aircraft has tandem wings at the front and rear of the vehicle with a combined center of lift near the center of gravity (CG) of the aircraft. The wings provide lift and control during cruise, with one or more aft-located propellers to provide forward thrust. The combination of vertical lift rotors and front and rear tandem wings bound the rotors, permitting movement in the aircraft's center of gravity while still enabling the vehicle to maintain vertical and horizontal flight control. The forward and rear wings are also located to provide a boundary to avoid foreign object damage (FOD) to the lift rotors. The control surfaces, which include elevator and ailerons, are usable to compensate for changes in CG of the aircraft during flight by adjusting the center of lift, in addition to changing angle of attack and attitude. The vertical lift rotors are arranged around the CG, and the thrust of each rotor is adjustable, which permits the relocation of the center of lift in vertical flight if the CG shifts.

Due to the multiple number and independence of the vertical lift rotors, the vertical thrust is redundant and thrust and control remain available even with the failure of any single rotor. Since there are multiple vertical rotors that provide large control forces, the rotors are able to be smaller, with faster response rates for operation even in gusty wind conditions. In one embodiment a separate electric motor and controller powers each vertical lift rotor, in order to provide lift system redundancy from failure of one or more lifting rotors. In some embodiments, the vertical thrust rotors are embedded in ducts that conceal them and provide increased lift. In other embodiments, protective shrouding guards against contact with other objects and prevent FOD to the rotors. The protective shielding in combination with in-line vertical lift rotors provide low cruise drag for efficient flight. Low tip speed vertical lift rotors are used in various embodiments to produce low community noise levels during takeoff, transition, and landing. Embodiments with a low front wing and high rear wing with winglets provide high aerodynamic efficiency while also providing yaw stability for the aircraft. In some embodiments, the wings fold to provide a compact vehicle footprint when in hover or while on the ground. Some embodiments of the wing have control surfaces only on the inner part of the wing fold so that no articulating control linkages are required. Since the lift rotors that are used for vertical lift are separate from the forward thrust propellers, each is optimized for its specific operating conditions. Such a vehicle can be used for either piloted or unpiloted embodiments across a range of occupant sizes or payloads.

DETAILED DESCRIPTION

Figure 1:
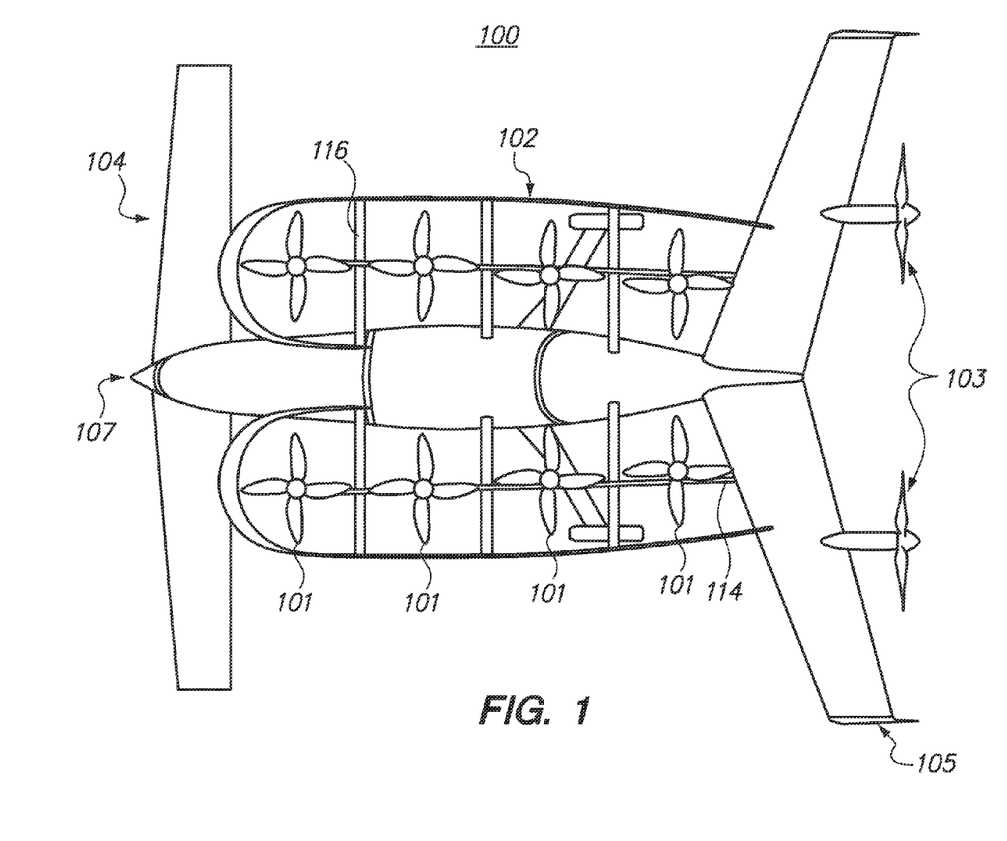
FIG. 1 is a top view of a personal aircraft vehicle in accordance with one embodiment.
Figure 2:
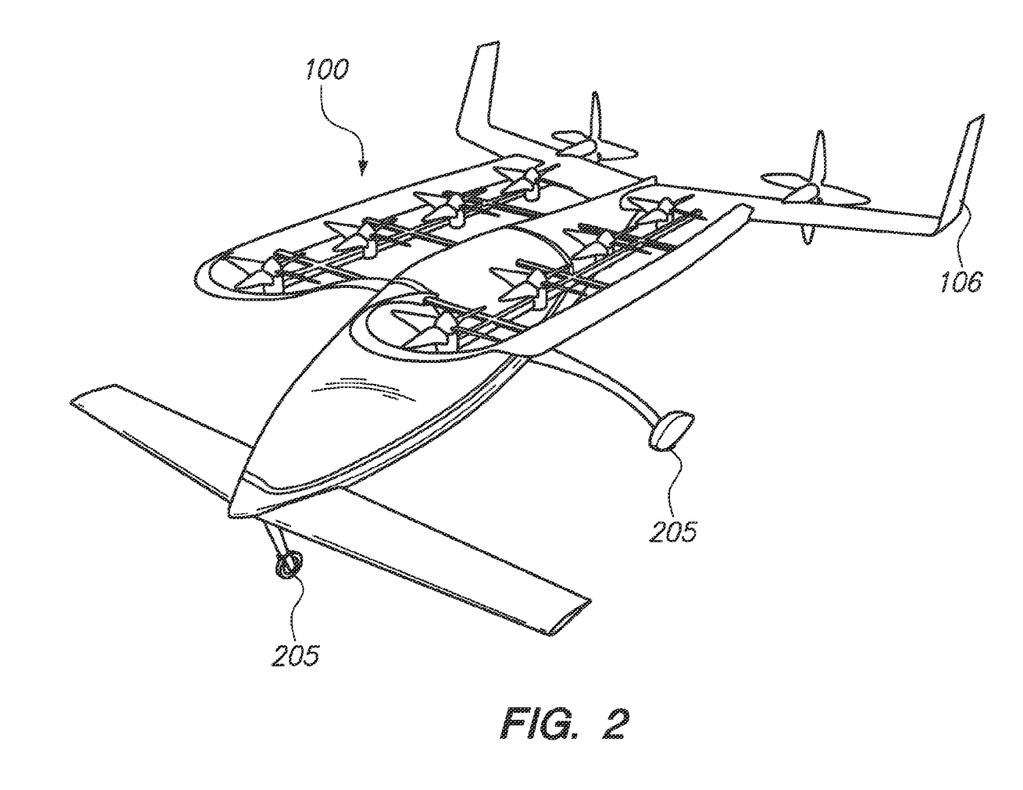
FIG. 2 illustrates a second view of a personal aircraft vehicle in accordance with one embodiment.
Figure 3:
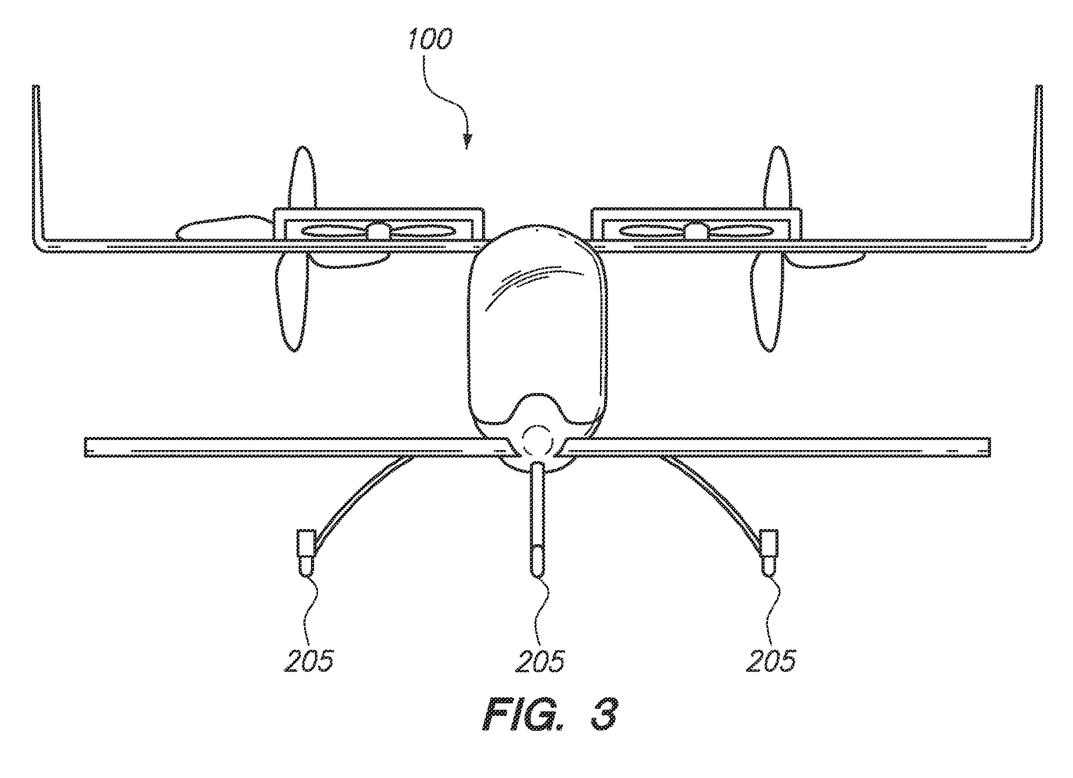
FIG. 3 illustrates a front view of a personal aircraft vehicle in accordance with one embodiment of the present invention.
Figure 4:
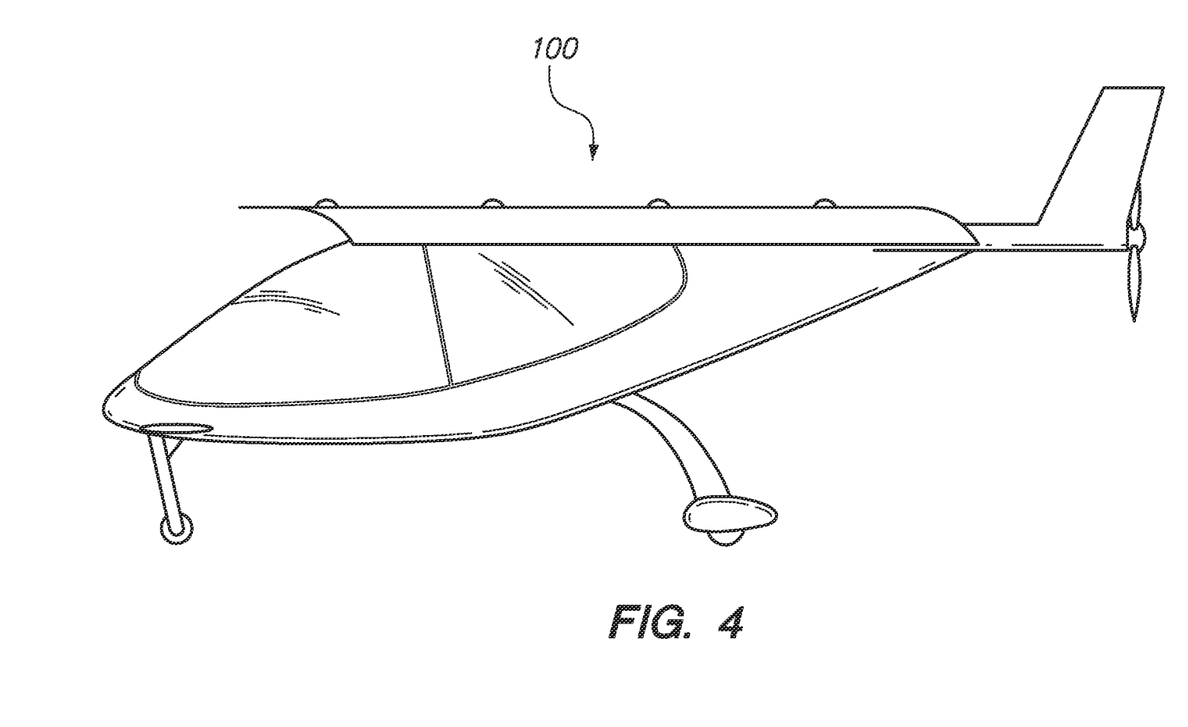
FIG. 4 illustrates a view of the left side of a personal aircraft vehicle in accordance with one embodiment.

FIG. 1 illustrates a personal aircraft 100 in accordance with one embodiment. Aircraft 100 includes vertical lift rotors 101; forward flight propellers 103; a forward wing 104; a rear wing 105 having winglets 106; protective shroud 102 (also known as a fence); and a fuselage 107. Fuselage 107 also includes landing gear and power source (not shown). FIG. 2 illustrates a second view of personal aircraft 100, including port-side main landing gear and nose landing gear 205. FIG. 3 illustrates a front view of personal aircraft 100, in which port landing gear, starboard landing gear and nose gear 205 are visible. FIG. 4 illustrates a view of the left (port) side of aircraft 100 in accordance with one embodiment.

In various embodiments, aircraft 100 is sized to accommodate a single pilot and personal cargo. For example, in various embodiments the length of the aircraft from nose to its aft-most surface is between 15 and 20 feet, and its wingspan is between 15 and 20 feet. In alternative embodiments, the aircraft may be longer or shorter, wider or narrower, as will be appreciated by those of skill in the art, without departing from the principles described here.

Aircraft 100 is constructed in various embodiments primarily of a composite material. Fuselage 107 and wings 104, 105 are made from carbon fiber composite material. In alternative embodiments, the wings may have metal fittings and ribs attached to the inside and outside of a carbon fiber composite wing skin. In some embodiments the wing skins may comprise composite materials made of carbon fiber combined with other composite materials such as Kevlar. In other alternative embodiments, the fuselage may comprise a metal truss made from material such as but not limited to steel or aluminum with a composite skin that covers the truss. The composite fuselage skin in this embodiment may be made of carbon fiber, Kevlar, or other composite materials as understood by those of skill in the art. The cockpit windows in one embodiment are polycarbonate, though other lightweight clear plastics may also be used. In some embodiments, fences 110 are made from a Kevlar and carbon fiber composite. In alternative embodiments, they are made only from carbon fiber or only from Kevlar or similar fibers.

Rotors 101 in one embodiment have a 16 inch radius, and are made from carbon fiber composite material, and in an alternative embodiment from carbon fiber composite blades attached to an aluminum hub. In other embodiments, rotors are made from wood blades attached to an aluminum hub, or wood blades attached to a carbon fiber composite hub. The rotors may be a single piece that bolts onto the motor assembly.

Aircraft 100 includes a forward wing 104 and an aft wing 105. The aft wing is swept back and has winglets 106 at its ends. The winglets provide lateral stability and decrease the drag due to lift on the aft wing. Sweeping the wing back improves the pitch stability of the aircraft and increases the benefits of the winglets on lateral stability. In some embodiments the aft wing can fold, and thus maintain the same overall vehicle length as an aircraft with an unswept aft wing. Additionally, the sweep of the aft wing provides more space for the rotors to fit into. Forward wing 104 is also attached to fuselage 107 at a point substantially lower than is aft wing 105 in various embodiments. A non-planar wing lifting system enables the wings to develop efficient lift during cruise flight. The vertical separation between the two wings is chosen to be as large as possible, given the constraint of attaching to the fuselage. By maximizing the wing vertical separation, the negative aerodynamic interaction between the front wing and the rear wing is reduced. Thus, the drag due to lift of the vehicle is significantly decreased, for example by 15-20% compared to a single in-plane wing lifting system.

The winglets 106 are located at the tip of rear wing 105 to provide decreased drag due to lift on the rear wing, as well as yaw or directional stability and control. The particular winglet shape is established for adequate stability, as will be understood by those skilled in the art. In some embodiments the winglets extend downward and provide improved controllability by reducing the coupling between the sideslip angle of the aircraft and the yawing moment that the airflow produces on the aircraft. In other embodiments, as illustrated in FIG. 2, the winglets 106 extend upwards.

In one embodiment, the tandem wing system has joints where the wingtips on each wing fold, allowing aircraft 100 to fit in a constrained space. For example, in one embodiment folding the wings enables the aircraft 100 to be stored an 8' by 7' by 16' space, or the space provided by a typical single car garage. In one embodiment the rear wing 105 has a dihedral angle of 8.4 degrees. In other embodiments the dihedral ranges between −10 and 10 degrees.

Vertical lift rotor assemblies 101 are mounted on each side of aircraft 100. In one embodiment, a propulsion boom 114 is secured to each side of the fuselage 107. Vertical lift rotor assemblies 101 are installed on top of the booms 114. Propulsion booms 114 are attached to the fuselage 107 with struts 116. The struts 116 are positioned so that the downwash from the rotors does not impinge on the struts. In some embodiments there are 3 struts connecting each boom to the fuselage. In alternative embodiments there are 2 or 1 struts connecting each boom to the fuselage. In other embodiments the struts may be swept forward, aft, up, or down to improve the attachment of the booms to the fuselage. In one embodiment, a vertically oriented support structure provides increased bending stiffness from the vertical lift rotor loads during hover.

Each vertical lift rotor assembly 101 includes a rotor and a motor. The rotor may comprise blades attached to a hub, or may be manufactured as a single piece with an integral hub. The hub provides a central structure to which the blades connect, and in some embodiments is made in a shape that envelops the motor. The motor includes a rotating part and a stationary part. In one embodiment the rotating part is concentric to the stationary part, known as a radial flux motor. In this embodiment the stationary part may form the outer ring of the motor, known as an inrunner motor, or the stationary part may form the inner ring of the motor, known as an outrunner motor. In other embodiments the rotating and stationary parts are flat and arranged in opposition to each other, known as an axial flux motor. The rotor is attached to the rotating part of the motor. The stationary part of the motor is attached to the propulsion boom 114. In some embodiments the motor is a permanent magnet motor and is controlled by an electronic motor controller. The electronic motor controller sends electrical currents to the motor in a precise sequence to allow the rotor to turn at a desired speed or with a desired torque.

As noted, aircraft 100 includes multiple rotor assemblies 101 per side. The vertical lift rotors are configured to generate thrust that is independent of the thrust generated by the forward flight propellers 103 during horizontal cruise. The vertical lift rotors provide enough thrust to lift the aircraft off the ground and maintain control. In one embodiment, each rotor generates more, e.g., 40% more, thrust than is needed to hover, to maintain control in all portions of the flight envelope. The rotors are optimized by selecting the diameter, blade chord, and blade incidence distributions to provide the needed thrust with minimum consumed power at hover and low speed flight conditions. In various embodiments, half of the rotors rotate in one direction, and the other half rotate in the opposite direction to balance the reaction torque on aircraft. In the embodiment illustrated in FIG. 1, four vertical lift rotor assemblies 101 per side are shown. In alternative embodiments more or fewer vertical lift rotors provide the vertical lift and control. When at least two rotors per side are present, the ability to produce a vertical force with equilibrium about the center of gravity is retained even when one rotor fails. This is achieved by decreasing the thrust on the opposite quadrant to the failed rotor. When three rotors per side are present, control about all three axes, or directions of flight, is available. As the number of rotors per side increases, the loss of any one rotor results in a decreasing overall loss of vertical thrust. However, with each extra pair of rotors there is increasing complexity and probability that a failure would result, as well as increased cost and weight.

In one embodiment, two vertical lift rotor assemblies 101 per side are located in front of the CG and two are located behind the CG. In this manner, the center of lift of the rotors in hover is co-located with the center of gravity of the aircraft 100. This arrangement permits a variation of longitudinal or lateral positioning of the payload in the fuselage 107 because each independent vertical lift rotor is able to modify its thrust to provide a balanced vertical lift or, alternatively, unbalanced lift to provide control.

Forward flight propellers 103 provide the thrust for transition to forward flight, climb, descent, and cruise. In one embodiment two or more forward thrust propellers 103 are mounted along the span of the rear wing 105. Alternatively, a single forward thrust propeller is mounted on the aft portion of the fuselage 107 at the center of the span. The propellers can be rotated in opposite directions so that the torque required to turn them does not produce a net torque on the airplane. Also, the thrust of the two propellers can be varied differentially to provide a yaw control moment. Positioning on the wing results in less inflow disturbance to the propellers. Use of a single propeller on the fuselage permits fewer components and less weight, but with a different-sized motor and with the inflow including disturbances from the fuselage. In one embodiment a single propeller is used in a hybrid-electric system having a small hydrocarbon-based fuel engine to provide power in forward flight and/or to recharge the battery system.

The fuselage 107 provides payload volume near the vehicle center of gravity as well as the attachment structure for the vertical lift rotors 101, forward wing 104, and the rear wing 105. Forward flight propellers 103 are also attached to the aft portion of the fuselage. Other embodiments have a protective shroud or the ducts attached to the fuselage in a fashion to provide the least interference with the rotor airflow, while resisting bending loads.

The vertical lift rotors and the forward propellers are driven by electric motors that are powered by a power system. In one embodiment the power system includes a battery that is attached to one motor controller for each motor. The battery provides a DC voltage and current that the motor controllers turn into the AC signals that make the motors spin in response to control input from the flight computer or other source. In alternative embodiments, the rotors and propellers are powered by a power system that includes a hybrid-electric system with a small hydrocarbon-based fuel engine and a smaller battery. The hydrocarbon engine provides extended range in forward flight and can recharge the battery system.

Figure 5:
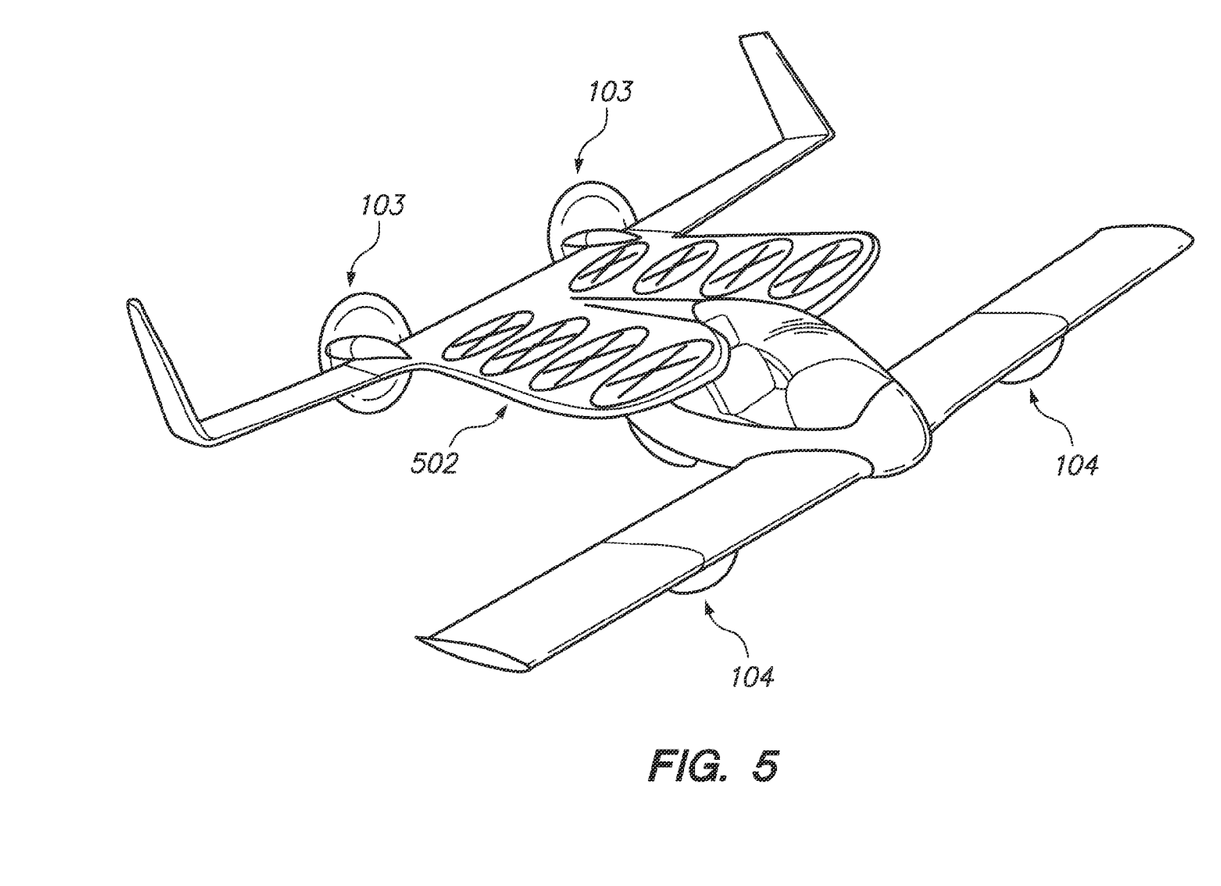
FIG. 5 illustrates a view of a personal aircraft with ducted rotors in accordance with one embodiment.
Figure 6:
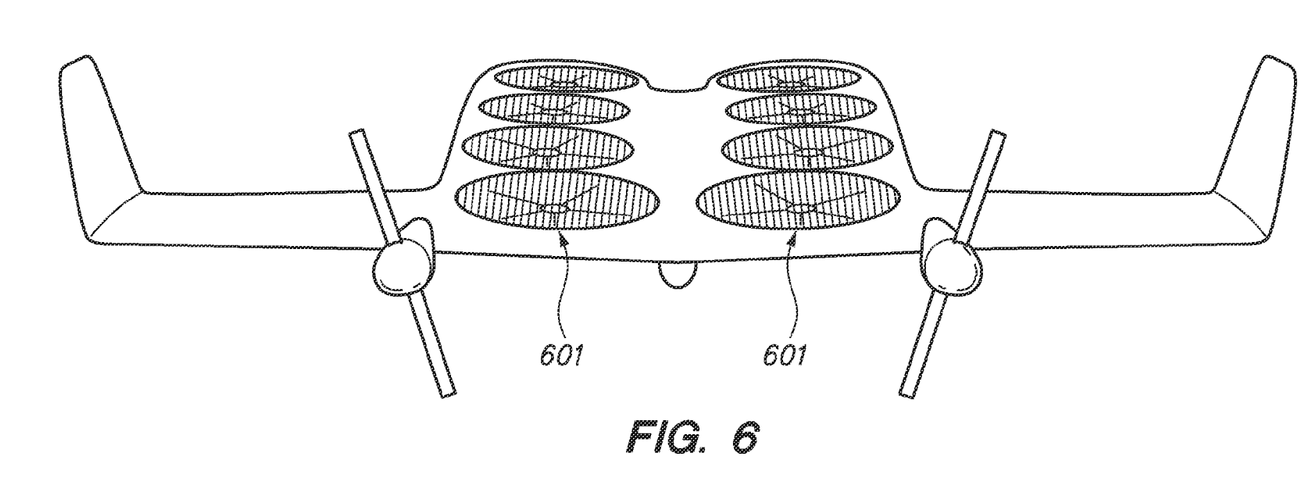
FIG. 6 illustrates a view of a personal aircraft with ducted rotors in accordance with an alternative embodiment.

The vertical lift rotor assemblies 101 in various embodiments are protected by either ducts or protective shrouds 102 to avoid accidental blade strikes. In one embodiment, as illustrated in FIG. 5, the rotor blades are completely and tightly surrounded by a duct 502 that also provides incremental lift. This additional lift is generated by suction forces on the duct surface, due to the increased velocity of the air in front of the rotors. In another embodiment, the rotor is loosely surrounded by only a protective shroud 102 or fence. Referring to FIG. 6, in those embodiments that use vertical lift ducts, the ducts have embodiments either with or without duct covers 601 that seal the ducts from airflow during cruise flight to decrease the vehicle drag.

The vertical lift rotors 101 generate thrust that is independent from the thrust generated by the forward flight rotors 103 during horizontal cruise. In some embodiments this permits fixed pitch to be used for both the rotors and propellers. This independence of thrust generation as opposed to having the same rotors generating both the vertical and horizontal thrust, permits the rotors 101 to be optimized for zero-airspeed flight performance and low noise, without the need for a variable pitch mechanism. The rotors are optimized by designing for a single pitch blade setting at the hover and low speed flight conditions. The forward flight propellers 103 are optimized for cruise airspeed flight performance, also without the need for a variable pitch mechanism. These blades are designed with the optimum pitch, twist, taper, and rpm for cruise operation. Since the rotor and propellers are completely separate, they are able to have different characteristics, such as tip speed, rpm, and diameter so that they are optimal at their specific operating conditions. This decreases the mechanical complexity of the propulsion system.

Longitudinal arrangement of multiple vertical lift rotors 101 permits pitch, roll, and yaw moments as well as vertical force to be generated directly through a combination of direct thrust or differential torque across the combination of rotors. By varying the thrust of rotors in different locations on the vehicle, the control moments are created. By varying thrust on some of the rotors, the altitude can be controlled. The use of direct thrust and differential torque provides predictable control forces. The result is more rapid response rates and gust responsiveness, which is enhanced by the low moments of inertia of the small diameter vertical lift rotors 101 and the high torque and response rates of electric motors. Combined, this system enables a control system that is accurate and responsive to the pilot control inputs.

As noted, the use of multiple independently controlled rotors provides a redundant lift system. For example, a system that includes six or more rotors permits hover and vertical ascent with safe operation without forward airspeed, even if one or several individual components fail.

The vertical lift rotors 101 are arranged longitudinally along the aircraft direction of travel in-line to reduce the cruise drag. Other embodiments have the rotors offset in other ways, either to align with the body airflow, or to provide a more compact footprint. One embodiment has an in-line arrangement with a horizontally oriented support structure that attaches to the fuselage 107.

As noted, wing 104 and 105 fold in some embodiments. Some embodiments have a wing fold that is positioned at a location where the loads are small, outboard of 50% of the span, for example, to permit a lighter weight hinge. In other embodiments, the forward wing does not fold. In other embodiments, the wings fold so the aircraft can fit into an 8' wide space, such as a typical single car garage. Alternative embodiments also include folding the forward wing in other ways, such as in a scissor motion underneath the fuselage or along the side of the fuselage. This scissor folding is accomplished through pivot and pin at the center of the front wing that permits a rotation backwards about that center pivot point. This embodiment permits wing articulation about a single point to reduce weight at a location where the wing structural depth is largest, as well as enabling the front wing to be folded completely away to the side of the vehicle by an electro mechanical actuator to promote better pilot visibility while in hover or on the ground. In an embodiment including a scissor-fold front wing, the landing gear includes a single front wheel with two main rear landing gear wheels.

The rear wing 105 also provides a portion of the aircraft lift during forward flight. In one embodiment, and referring to FIGS. 7A and 7B, the rear wing fold 302 permits the rear wing structure to articulate downward to permit ground operation or storage in a more compact footprint. Folding downward permits the winglet 303 to fit into the small door opening or parking storage space, both in terms of the vehicle width and height. In other embodiments, the rear wing does not fold. Alternative embodiments also include folding the rear wing in other ways, such as upward and on top of the rear wing if longer spans are desired and not capable of folding while clearing the ground.

In one embodiment, aircraft 100 is capable of taking off and landing with the front and rear wings folded. Taking off and landing with the wings folded in vertical flight decreases the gust response of the vehicle due to unsteady wind conditions through decreased wing lift performance and shorter wing spans. Since the wing lift is not required in hover flight, but only in forward flight, is it possible to wait to unfold the wings until sufficient altitude is achieved away from ground. Avoiding ground wing unfolding is advantageous for some operations where the ground takeoff and landing space available and wind conditions are not favorable. An electromechanical actuator provides the actuation force to unfold the wing before commencing forward flight.

Figure 7A:
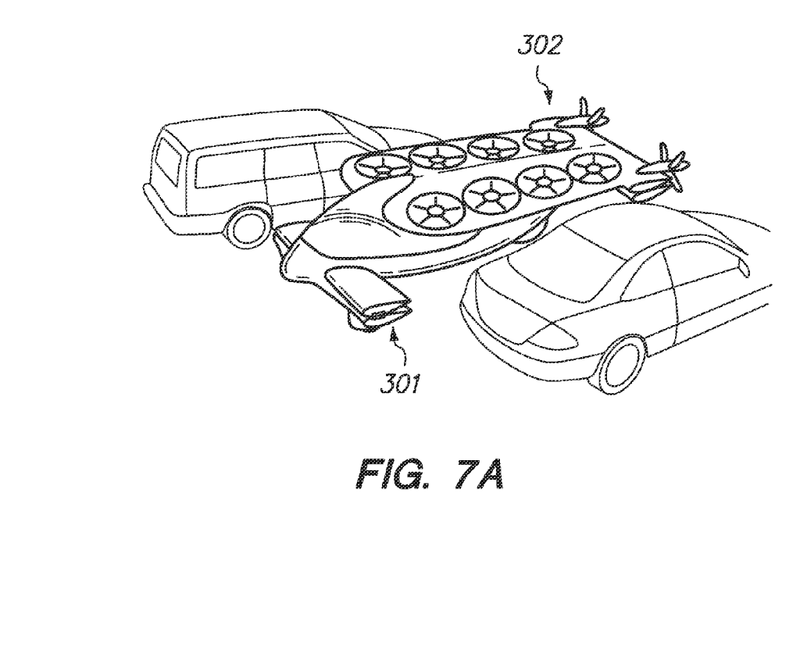
FIGS. 7A and 7B illustrate two views of a personal aircraft with folded wings in accordance with one embodiment.
Figure 7B:
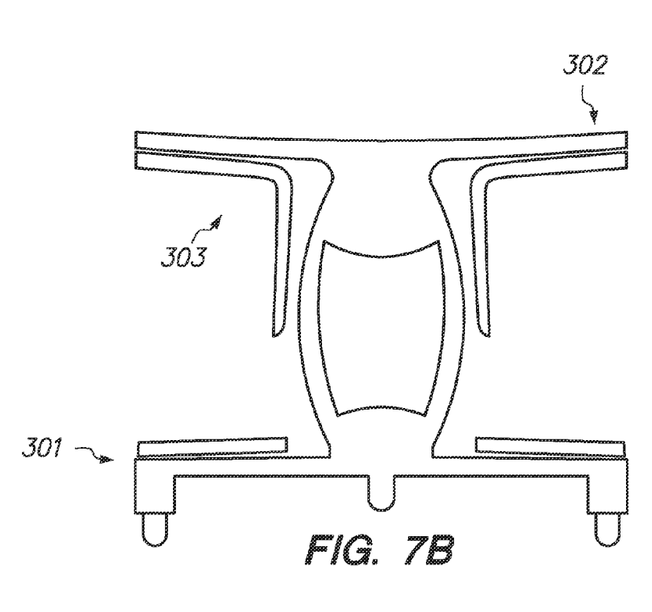

In one embodiment, control surfaces are located on the inner portion of the front wing fold 301 and rear wing fold 302 to permit folding without control lines required outboard of the folding hinge mechanism to provide less mechanical complexity through fewer moving parts. The control surfaces provide pitch, roll, and yaw control during forward flight aerodynamically so that the vertical lift rotors are not required for control except at low or zero forward speed. Other embodiments that require greater forward flight control responsiveness also have control surfaces outboard of the wing fold mechanism. Other embodiments only have control surfaces on the outboard section of the wing.

Landing gear 205 is provided with wheels to permit the aircraft to move while on the ground. One forward 204 and two rear 202 main landing gear provide lower drag and less lift interference on the front wing. In other embodiments the landing gear is a skid and has no wheels, since the aircraft is capable of takeoff and landing without forward movement. Alternative embodiments include two forward and one rear main landing gear to permit the front landing gear to be widely separated for ground stability. In some embodiments, some or all of the wheels are fitted with electric motors that allow the wheels to be driven. Such motors allow the vehicle to be self-propelled while on the ground.

In addition to the embodiments specifically described above, those of skill in the art will appreciate that the invention may additionally be practiced in other embodiments. For example, in an alternative embodiment, aircraft 100 is designed to accommodate two or more occupants. In such an embodiment, the wingspan is larger, the rotors have a larger diameter, and the fuselage 107 is wider. In an alternative embodiment, aircraft 100 is an unmanned vehicle that is capable of flight without a pilot or passengers. Embodiments without passengers have additional control systems that provide directional control inputs in place of a pilot, either through a ground link or through a predetermined flight path trajectory.

Although this description has been provided in the context of specific embodiments, those of skill in the art will appreciate that many alternative embodiments may be inferred from the teaching provided. Furthermore, within this written description, the particular naming of the components, capitalization of terms, etc., is not mandatory or significant unless otherwise noted, and the mechanisms that implement the described invention or its features may have different names, formats, or protocols.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. An aircraft comprising:
a fuselage;
a forward wing coupled to the fuselage and located forward of a center of gravity;
an aft wing coupled to the fuselage and located aft of the center of gravity;
a first mounting boom extending from a port side of the fuselage via a first plurality of struts;
a second mounting boom extending from a starboard side of the fuselage via a second plurality of struts;
a first plurality of lift rotors, each rotor mounted on the first mounting boom between the forward wing and the aft wing on the port side of the fuselage and configured to produce an amount of vertical thrust independent of levels of vertical thrust produced by the other rotors;
a second plurality of lift rotors, each rotor mounted on the second mounting boom between the forward wing and the aft wing on the starboard side of the fuselage and configured to produce an amount of vertical thrust independent of levels of vertical thrust produced by the other rotors; and
a first propeller coupled to a port side of the aft wing and a second propeller coupled to a starboard side of the aft wing.

2. The aircraft of claim 1 wherein the forward wing includes a plurality of joints configured to allow portions of the forward wing outboard of each joint to fold.

3. The aircraft of claim 2 wherein the aft wing includes a plurality of joints configured to allow portions of the aft wing outboard of each joint to fold.

4. The aircraft of claim 1 further comprising:
a first shroud coupled to the fuselage and coplanar to the first plurality of rotors, and extending substantially around an outboard portion of the first plurality of rotors; and
a second shroud coupled to the fuselage and coplanar to the second plurality of rotors, and extending substantially around an outboard portion of the second plurality of rotors.

5. The aircraft of claim 1 wherein the aft wing further comprises a first winglet coupled to an outboard port edge of the aft wing and a second winglet coupled to an outboard starboard edge of the aft wing.

6. The aircraft of claim 1 wherein the first plurality of lift rotors is 4 and the second plurality of lift rotors is 4.

7. The aircraft of claim 1 wherein the lift rotors in the first and second plurality of lift rotors are driven by electric motors.

8. The aircraft of claim 1 wherein the forward wing and the aft wing are not in the same horizontal plane.

9. The aircraft of claim 1 further comprising:
a forward landing gear coupled to the fuselage;
a port main landing gear coupled to the fuselage; and
a starboard main landing gear coupled to the fuselage.

10. The aircraft of claim 1 further comprising a skid landing gear coupled to the fuselage.

11. A method for flying a VTOL aircraft, the method comprising:
providing the aircraft of claim 1;
producing using the first and second plurality of rotors a vertical thrust to cause the aircraft to ascend;
producing forward thrust to the aircraft using the propeller.

12. The method of claim 11 further comprising:
transitioning the aircraft from vertical to forward flight by reducing the vertical thrust produced by the rotors while increasing the forward thrust produced by the propeller.

13. The aircraft of claim 4 wherein the fuselage and wings are made from carbon fiber composite material.

14. The aircraft of claim 1 wherein the at least one of the forward wing and the aft wing includes a composite wing skin having an inner portion and an outer portion, metal fittings, and ribs, wherein the metal fittings and ribs are attached to the inner portion of the composite wing skin.

15. The aircraft of claim 14 wherein the wing skin is made of carbon fiber combined with an impact resistant material.

16. The aircraft of claim 1 wherein the fuselage includes a truss and a composite skin covering the truss.

17. The aircraft of claim 4 wherein at least one of the first shroud and the second shroud is made from materials comprising at least one of an impact resistant material and carbon fiber composite.

18. The aircraft of claim 1 wherein at least one of the first plurality of lift rotors and the second plurality of lift rotors is made from a carbon fiber composite material.

19. The aircraft of claim 1 wherein at least one of the first plurality of lift rotors and the second plurality of lift rotors include rotors comprising an aluminum hub and carbon fiber blades attached to the aluminum hub.

20. The aircraft of claim 1 wherein the aft wing is swept back.

21. The aircraft of claim 5 wherein the first winglet extends upward from the outboard port edge of the aft wing and the second winglet extends upward from the outboard starboard edge of the aft wing.

22. The aircraft of claim 21 wherein the first winglet includes a first joint about which the first winglet rotates and the second winglet includes a second joint about which the second winglet rotates.

23. The aircraft of claim 5 wherein the first winglet extends downward from the outboard port edge of the aft wing and the second winglet extends downward from the outboard starboard edge of the aft wing.

24. The aircraft of claim 23 wherein the first winglet includes a first joint about which the first winglet rotates and the second winglet includes a second joint about which the second winglet rotates.

25. The aircraft of claim 20 wherein the aft wing includes a dihedral angle between −10 degrees and 10 degrees.

26. The aircraft of claim 1 wherein a first set of lift rotors from the first plurality of lift rotors rotate in a first direction and a second set of lift rotors from the first plurality of lift rotors rotate in a second direction opposite the first direction.

27. The aircraft of claim 26 wherein a first set of lift rotors from the first plurality of lift rotors is located on one side of the center of gravity of the aircraft and a second set of lift rotors from the first plurality of lift rotors is located on another side of the center of gravity.

28. The aircraft of claim 26 wherein the aircraft further comprises a plurality of motors, each motor attached to one of the first plurality of lift rotors or one of the second plurality of lift rotors and is powered by a battery coupled to a motor controller for the motor.

29. The aircraft of claim 26 wherein the aircraft further comprises a hybrid-electric power system that powers the first plurality of lift rotors and the second plurality of lift rotors.

30. The aircraft of claim 26 further comprising:
a plurality of lift ducts;
wherein each of the first plurality of lift rotors is mounted within one of the plurality of lift ducts.

31. The aircraft of claim 30, further comprising:
a plurality of duct covers, each duct cover coupled to one of the first plurality of lift rotors and configured to seal the lift rotor coupled to the duct cover during cruise flight to reduce drag.

32. The aircraft of claim 9 wherein the forward landing gear, the port main landing gear, and the starboard main landing gear are skids having no wheels.

33. The aircraft of claim 9 further comprising:
a plurality of electric motors, each electric motor coupled to a wheel of one of the forward landing gear, the port main landing gear, and the starboard main landing gear and configured to drive the wheel.

34. The aircraft of claim 2 further comprising:
one or more actuators configured to fold and unfold the forward wing outboard of each joint.

35. The aircraft of claim 3 further comprising:
one or more actuators configured to fold and unfold the aft wing outboard of each joint.

* * * * *